United States Patent [19]

Shindelar

[11] 4,303,098

[45] Dec. 1, 1981

[54] FEMALE COUPLER

[75] Inventor: Aloysius C. Shindelar, Hudson, Iowa

[73] Assignee: Deere & Company, Moline, Ill.

[21] Appl. No.: 139,878

[22] Filed: Apr. 14, 1980

[51] Int. Cl.³ .................... F16L 37/28; F15B 13/042
[52] U.S. Cl. ........................ 137/614.06; 137/596.2; 137/627.5; 137/614.05
[58] Field of Search ................ 137/614.05, 614.06, 137/614.04, 627.5, 596.2; 251/149.6, 149.9

[56] References Cited

U.S. PATENT DOCUMENTS

| 695,839 | 3/1902 | Roberts et al. | 137/596.2 |
|---|---|---|---|
| 3,036,595 | 5/1962 | Rogers | 251/149.6 |
| 3,213,884 | 10/1965 | Moyer et al. | 137/614.03 |
| 3,301,272 | 1/1967 | Petty John et al. | 137/614.06 |
| 3,348,575 | 10/1967 | Simale | 137/614.05 |
| 3,809,122 | 5/1974 | Berg | 251/149.9 |
| 3,881,514 | 5/1975 | Berg | 137/614.04 |
| 4,249,572 | 2/1901 | Shindelar | 137/614.05 |

Primary Examiner—A. Michael Chambers

[57] ABSTRACT

This invention relates to a female coupler which comprises a housing, a receptacle movably positioned within the housing, and a main and a secondary valve means situated within the receptacle. The two valve means control the flow of fluid into and out of the coupler. In addition, a lever-actuatable cam means is utilized to both move the receptacle to facilitate engagement with a male coupler and to move the secondary valve means to release fluid pressure within the female coupler.

18 Claims, 5 Drawing Figures

FEMALE COUPLER

BACKGROUND OF THE INVENTION

1. Field of the Invention

This invention relates to a female coupler for coupling to and uncoupling from a pressurized or non-pressurized male coupler such as those used in hydraulic or pneumatic hookups.

2. Description of the Prior Art

Numerous female couplers are currently available for coupling to and uncoupling from a pressurized or non-pressurized male coupler. However, most of these couplers exhibit hookup problems in pressurized situations because they are not designed to handle occasional large pressure differences between the male check member and the female check member. One such cause of this large pressure difference is the thermal expansion of the fluid in the hydraulic hoses to which the couplers are attached. As the temperature increases, the fluid expands, and this action significantly increases the internal pressure. This problem is especially noticeable in farm implements which tend to be parked in an open field for extended periods of time. The heat from the sun causes the fluid to expand and this makes the coupling and uncoupling process difficult.

A number of prior art couplers have tried to solve this troublesome problem but with only minimal success. One such coupler is the self-relieving fluid coupler which was disclosed by applicant in U.S. patent application, Ser. No. 118,267, filed Feb. 4, 1980, now U.S. Pat. No. 4,249,572, which is a continuation of Ser. No. 927,462, filed on July 24, 1978, abandoned. This earlier application partially eased the coupling problem but not to the extent of the present invention. This earlier application differs from the present invention in that it does not employ a lever-actuatable cam, a piston, or an independent secondary valve means to overcome the internal fluid pressure. In addition, applicant knows of no prior art coupler which incorporates a piston for mechanically overcoming the increase in fluid pressure.

The general object of this invention is to provide a female coupler which is easy to connect to and disconnect from a pressurized or non-pressurized male coupler. A more specific object of this invention is to provide a female coupler with a lever-actuatable cam for easily coupling to and uncoupling from a pressurized male coupler.

Another object of this invention is to provide a lever-actuatable female coupler.

Still another object of this invention is to provide a female coupler with a piston which is able to overcome pressure differentials which occur by the expansion of the fluid in the hydraulic hoses due to increases in temperatures.

A further object of this invention is to provide a reliable and inexpensive female coupler.

Other objects and advantages will become apparent to one skilled in the art based upon the ensuing description.

SUMMARY OF THE INVENTION

Briefly, this invention relates to a female coupler for coupling to and uncoupling from a male coupler. Such a female coupler is especially useful when the male coupler is pressurized because such pressurization usually makes the coupling process more difficult. The female coupler of this invention comprises a housing which contains a movable receptacle having a main cavity, inlet and outlet ports which communicate with the main cavity, and an engagement bore. The engagement bore and the main cavity are connected together by a passageway and the engagement bore is capable of receiving the male coupler. Within the main cavity is positioned a movable main valve means which controls the flow of a fluid between the main cavity and the engagement bore. This movable main valve means comprises a valve member with a passage and an elongated stem at one end which is capable of projecting through the passageway into the engagement bore for contacting a male check member of the male coupler. The male check member, which can be a valve of the ball and seat arrangement, opens when the ball is forced back away from the seat. As this occurs, the fluid can flow either into or out of the female coupler. In addition, the movable main valve means contains a beveled surface positioned adjacent to the elongated stem which mates with a valve seat on the interior surface of the receptacle for blocking the passageway.

A movable secondary valve means is situated within the outlet port and functions to control the flow of the fluid therethrough. Located between this secondary valve means and the main valve means is a movable piston which serves to assist in moving the main valve means against excessive pressure which may be present in the male coupler. This piston contains a first large planar surface on which the fluid can impinge and a second surface which contacts the main valve means. As the fluid impinges on the first large planar surface of the piston, the piston is moved into contact with the main valve means and causes the main valve means to move in a like direction. This movement causes the elongated stem to contact and force open the male check member thereby allowing fluid to flow through the passageway.

To assist in engaging and disengaging the couplers, a lever-actuatable cam, which is attached to the housing, is employed. This lever-actuatable cam actuates both the receptacle and the secondary valve means.

DETAILED DESCRIPTION OF THE INVENTION

Figure 1:
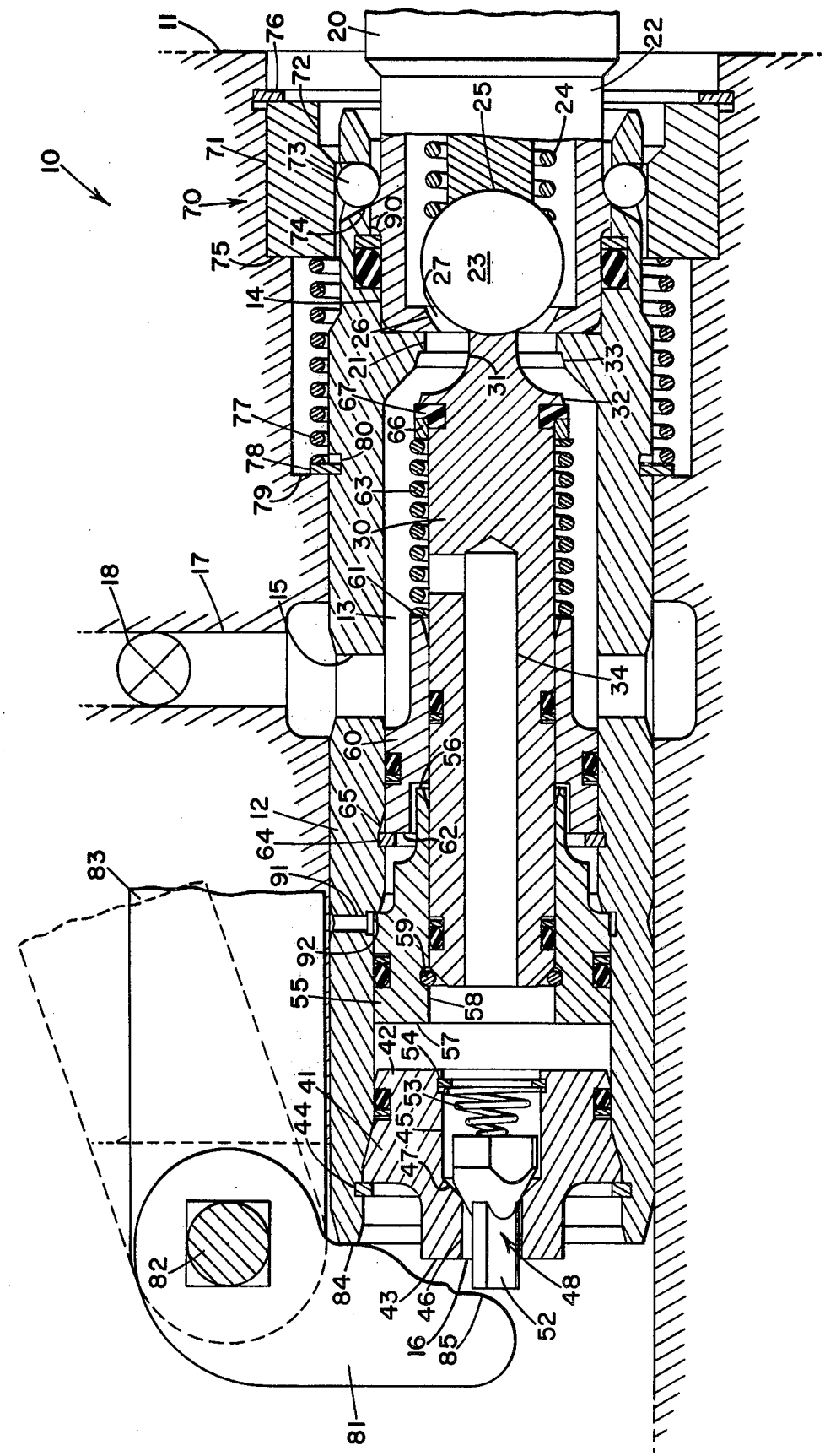
FIG. 1 is a sectional view of the female coupler with an attached male coupler showing the main valve means in an open position.

Referring now to the drawings, FIG. 1 shows a female coupler 10 which is designed to be coupled to and uncoupled from a male coupler 20. Such female couplers 10 are common features on agricultural vehicles where they serve to provide a connection through which a fluid can flow. As used throughout this application, the female coupler 10 will be described for use in connecting two hydraulic fluid lines together, although it should be understood that the female coupler can handle any type of fluid such as oil, water, gasoline, air, compressed gas, etc.

For purposes of convenience, and not by way of limitation, the viewer's right will be taken as the right-hand side of the female coupler 10. This female coupler 10 comprises a housing 11 which encloses a movable receptacle 12. The movable receptacle 12 contains a main cavity 13, preferably centrally located, a rightwardly extending engagement bore 14, an inlet port 15 and an outlet port 16. The inlet and outlet ports 15 and 16 respectively, both communicate with the main cavity 13. One or more inlet ports 15 can be constructed about the periphery of the main cavity 13.

The quantity of fluid which is directed to the inlet port 15 through a conduit 17 is controlled by a valve 18. The valve 18 is preferably a two-way valve which can regulate the flow of fluid to or from the female coupler 10. In addition to the flow of fluid through valve 18, a small amount of fluid will pass through the outlet port 16. This fluid can be collected in a reservoir (not shown), from which the fluid can later be recycled and used.

The right-hand engagement bore 14 is designed to receive a male coupler 20 and therefore is open on the right-hand end. Aligned opposite this opening is a passageway 21 which connects the engagement bore 14 to the main cavity 13. Normally, the male coupler 20 which is inserted into the engagement bore 14 comprises a male check member 22. The male check member 22 includes a check ball 23, a compression spring 24, a stop 25 and a seat 26 against which the check ball 23 rests. This male check member 22 is normally spring biased to the closed position wherein the check ball 23 contacts the seat 26. The male check member 22 is attached to an end of a hose, which in turn is connected to a hydraulic function such as a hydraulic motor. The hydraulic motor then actuates a mechanism.

During the coupling process, the spring 24 and the stop 25 of the male check member 22 serve to limit the rightward movement of the check ball 23. The spring 24 assures that the check ball 23 will always be forced towards the seat 26.

Positioned within the main cavity 13 of receptacle 12 is a movable main valve means 30, preferably a poppet valve. This movable main valve means 30 comprises an elongated stem 31 at the right-hand end. The elongated stem 31 is capable of projecting through the passageway 21 and into the engagement bore 14 as the movable main valve means 30 moves rightward. In so doing, the elongated stem 31 will contact the male check ball 23. Adjacently positioned on the movable main valve means 30, just left of the elongated stem 31, is a beveled surface 32 which mates with an interior valve seat 33. This interior valve seat 33 is formed on the inside of the receptacle 12. When the beveled surface 32 is seated against the interior valve seat 33, the passageway 21 is blocked. This blocking of the passageway 21 occurs when the movable main valve means 30 is moved to its rightmost position. Constructed within the movable main valve means 30 is a passage 34, preferably an internal passage, which provides a corridor through which fluid can flow from the inlet port 15 to the outlet port 16.

To the left of the movable main valve means 30 is the outlet port 16, preferably circular in cross section and in axial alignment with the axis of the receptacle 12. This outlet port 16 can be constructed in an end member 41 having a flat right-hand surface 42 and a left-hand surface 43. This end member 41 can be held secure to the left end of the receptacle 12 by a snap ring 44. Other methods of fastening the end member 41 to the receptacle 12 can be used, such as a press fit, by the use of screw threads, etc.

Figure 3:
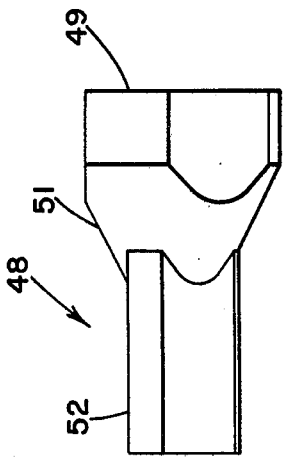
FIG. 3 is an enlarged side view of the secondary valve stem.
Figure 4:
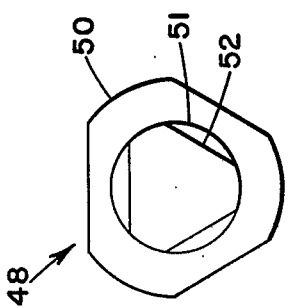
FIG. 4 is an enlarged left end view of the secondary valve stem of FIG. 3.

The outlet port 16 is formed with two different internal diameters, 45 and 46 respectively, joined by a circular cone-shaped inclined surface forming a valve seat 47. The smaller of the two internal diameters 46 is in the leftmost position, away from the main cavity 13. Contained within the outlet port 16 is a movable secondary valve means 48 which is preferably a poppet valve. This movable secondary valve means 48 can move between an open position and a closed position to control the flow of fluid out of the outlet port 16. As seen in FIGS. 3 and 4, the movable secondary valve means 48 is of a complex configuration. As shown, the movable secondary valve means 48 contains a flat right-hand surface 49, preferably triangular in cross section, with rounded corners 50. To the left of this flat surface 49 is a circular tapered section 51 which narrows into a second elongated triangular stem 52. The circular tapered section 51 forms a mating surface which mates with the valve seat 47. The elongated item 52, as well as the flat right-hand surface 49, can have a cross section which is other than triangular. The purpose for the triangular cross section is to allow any fluid that may be present within the main cavity 13 to slowly seep out the outlet port 16. This seepage will continue until the circular tapered section 51 mates with the valve seat 47.

Again, referring to FIG. 1, the movable secondary valve means 48 is situated in the outlet port 16 and is held in a closed position by a spring 53. By a closed position is meant that the circular tapered section 51 of the movable secondary valve means 48 is mating with the valve seat 47. In this position, a portion of the elongated stem 52 will project beyond the left-hand surface 43 of end member 41. With the movable secondary valve means closed, the flow of fluid through the outlet port 16 is completely blocked.

The spring 53, which abuts the flat right-hand surface 49, is held in place by a retainer ring 54 mounted in the end member 41. The use of the spring 51 is purely optional because any increases in fluid pressure within the main cavity 13 should be sufficient to close the movable secondary valve means 48. The spring 51 assures that the movable secondary valve means 48 will be biased to the closed position at all times.

Figure 5:
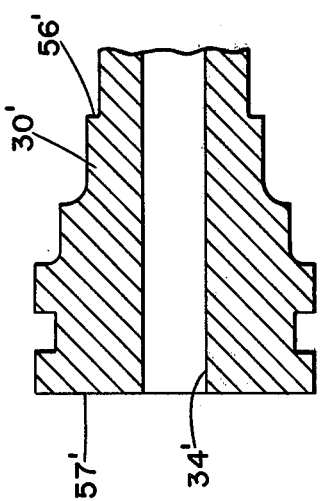
FIG. 5 is an enlarged partial side view of another embodiment of a main valve means.

Positioned within the main cavity 13 between the movable main valve means 30 and the movable secondary valve means 48 is a movable piston 55. This piston 55 is shaped like a collar and has a right-hand end surface 56, a large flat end surface 57, and an internal surface 58. Mounted on the internal surface 58 is a snap ring 59 which is designed to abut the left-hand end of the movable main valve means 30. The piston 55 operates by the force of fluid pressure which impinges on the large flat left end surface 57. As the fluid pressure within the main cavity 13 builds up, the piston 55 will be driven to the right. In moving rightward, the snap ring 59 will contact the left-hand end of the movable main valve means 30 and exert a rightward force upon it. In FIG. 5, an alternative arrangement is depicted wherein the same effect as having a piston is accomplished by designing the left-hand portion 57' of the movable main valve means 30' as shown. The main valve means 30' would contain a shoulder 56' which would serve the same purpose as the right-hand end surface 56, and a passage 34' which replaces passage 34.

Referring again to the piston 55, it is restricted in its movement to the left by the right surface 42 of the end member 41. It is also restricted in its rightward movement by engagement with a shoulder 92 located on the inner surface of the receptacle 12.

A collar member 60 is also positioned within the main cavity 13 and has a tubular shape so as to encircle the movable main valve means 30. This collar member 60 has a right-hand end surface 61 and a left-hand end surface 62. The right-hand end surface 61 is constantly in contact with a compression spring 63 which spirally encircles the right-hand periphery of the movable main valve means 30. The left-hand end surface 62 of the collar member 60 abuts a retainer ring 64 contained in a groove 65 on the inner surface of the receptacle 12. The combination of the compression spring 63 and the retainer ring 64 serve to limit the distance of travel of the collar member 60. A relief port 91 can be provided in the receptacle 12 between the piston 55 and the collar member 60 so that any trapped fluid can escape. Such fluid can be routed to a reservoir if desired.

Figure 2:
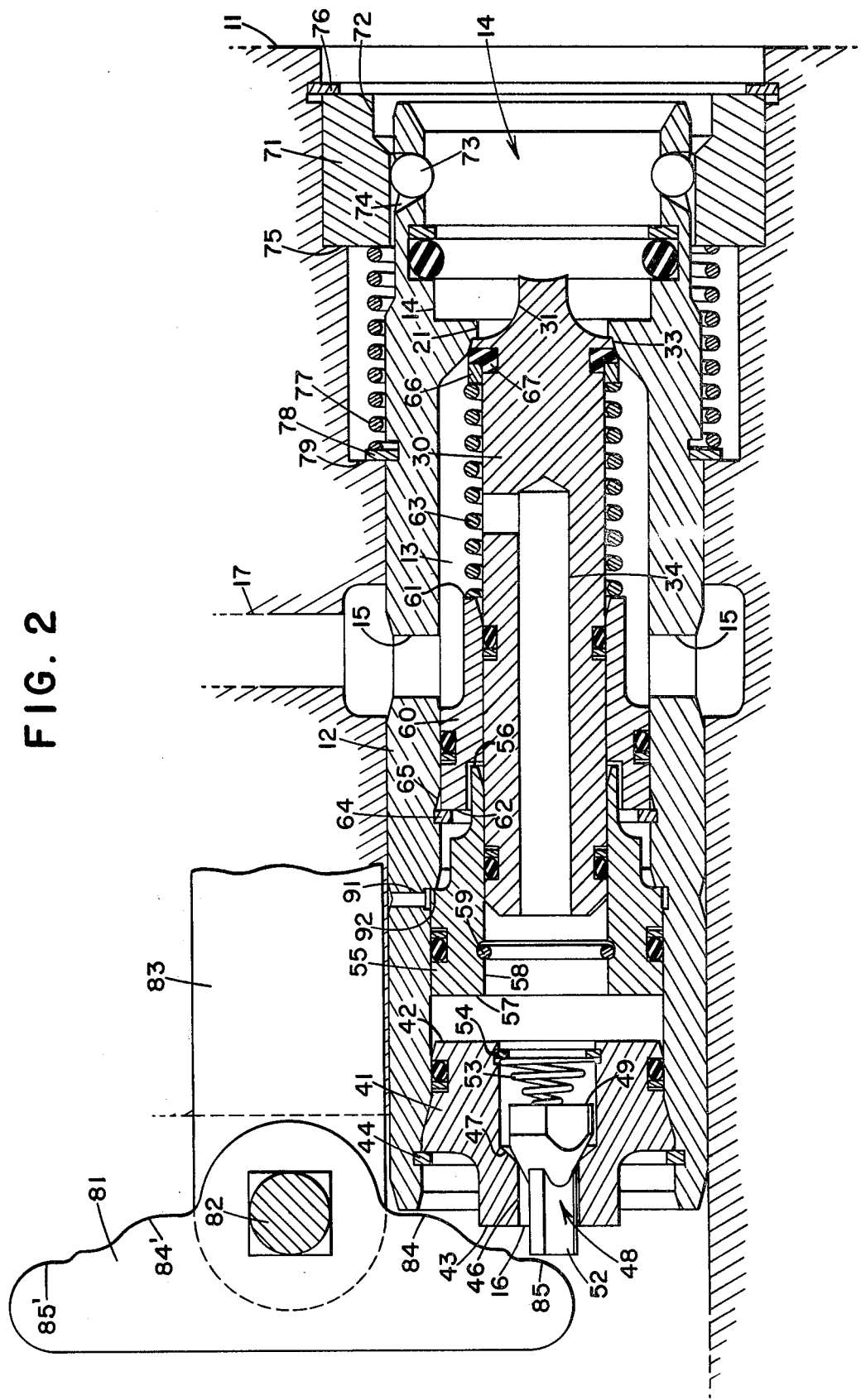
FIG. 2 is a sectional view of the female coupler showing the main valve means in a closed position and with an alternative cam arrangement.

Referring again to the compression spring 63, it is held in place by both a retainer ring 66 and a rubber seal 67 arranged about the periphery of the movable main valve means 30 just to the left of the beveled surface 32. This compression spring 63 functions to force the movable main valve means 30 to the right so that the beveled surface 32 seats against the interior valve seat 33 as shown in FIG. 2. This spring action causes the movable main valve means 30 to seal off the passageway 21, thereby blocking fluid flow.

Positioned circumferentially about the right-hand end of the receptacle 12 is an attaching device 70. This attaching device 70 serves to hold the male coupler 20 in the engagement bore 14. The attaching device 70 is comprised of a sleeve 71 with an internal race 72. The sides of the race 72 are preferably inclined to facilitate the acceptance of engagement balls 73 which are contained in sockets 74 located in the left most extremity of the receptacle 12. The sleeve 71 is held stationary within the housing 11 by a shoulder 75 and a retainer ring 76.

To the left of the sleeve 71 is a compression spring 77 which functions to spring load the receptacle 12 to the left. This compression spring 77 contacts a retainer ring 78 which abuts a shoulder 79 in the housing 11. The retainer ring 78 is inserted into a groove 80 machined into the outer surface of the receptacle 12. The force of the compression spring 77 will force the receptacle 12 to maintain a leftward position.

In order to move the receptacle 12 to the right against the bias of spring 77, a lever-actuatable cam 81 is employed. This lever-actuatable cam 81 is secured to the housing 11 in a pivotal relationship by pin 82. This lever-actuatable cam 81 includes two cam lobes 84 and 85. A lever arm 83 is attached to the pin 82 outside of the housing 11 and is used to cause movement of the cam 81. For the sake of simplicity, the lever arm 83 will be described as initially being in the horizontal position wherein it is capable of being raised up. By raising the lever arm 83, the cam lobe 84 contacts the left end of the receptacle 12 and the cam lobe 85 sequentially contacts the stem 52 of the movable secondary valve means 48. An alternative embodiment of the cam 81 is depicted in FIG. 2, wherein four cam lobes 84, 85, 84' and 85' are present. This allows two female couplers, only one of which is shown, to be actuated with only one lever 83. With this arrangement, movement of the lever arm 83 above the horizontal position will activate a lower female coupler (shown) and movement of the lever arm 83 below the horizontal position will activate an upper female coupler (not shown). Other arrangements and setups will be apparent to those skilled in the art. The primary purpose of the lever-actuatable cam 81, which incidentally can be manually or mechanically operated, is to facilitate the coupling and uncoupling of the female coupler 10 to and from the male coupler 20. The lever-actuatable cam 81 becomes especially important when the male coupler 20 is in a pressurized condition.

Numerous seals, such as O-rings and teflon rings, are utilized within the receptacle 12 to prevent leakage between the various elements. These seals have not been discussed in detail since their function is well known to those skilled in the art.

OPERATION

The operation of the female coupler 10 when coupling to and uncoupling from both a pressurized male coupler and a non-pressurized male coupler will now be described.

Coupling in a Non-pressurized Situation

To attach the female coupler 10 to a non-pressurized male coupler 20, the procedure is as follows. Starting with the movable main valve means 30 in a closed position, wherein the passageway 21 is blocked as depicted in FIG. 2 and with no incoming flow of fluid to the inlet port 15, the operator raises the lever arm 83. This action causes the cam lobe 84 to contact the left end of the receptacle 12 and push it to the right. As the receptacle 12 moves to the right, the engagement balls 73 will roll partially out of the sockets 74 and into the race 72. With the engagement balls 73 in the race 72, an unobstructed path into the engagement bore 14 is present into which the male coupler 20 can be inserted. In this position, the compression spring 77 is compressed and in turn, it exerts a leftward force on the receptacle 12. The receptacle 12 will therefore try to return to its initial position once the lever arm 83 is lowered.

As the lever arm 83 is raised further, the second cam lobe 85 will contact the elongated stem 52 and push the movable secondary valve means 48 to the right. The movable secondary valve means 48 is opened prior to the time the engagement balls 73 move into the race 72. By opening the outlet port 16, any fluid which may be present in the receptacle 12 can seep out. This assures that only a small quantity of non-pressurized fluid remains within the receptacle 12. The operator then inserts the male coupler 20 into the engagement bore 14 while holding the lever arm 83 in a raised position. As the operator holds the male coupler 20 in position with one hand, he lowers the lever arm 83 to its original position. This lowering of the lever arm 83 causes the cam lobes 84 and 85 to move leftward away from the receptacle 12. The receptacle 12 will also move leftward due to the force in the compression spring 77. As the receptacle 12 moves leftward, the engagement balls 73 will roll out of the race 72 and return to the sockets 74 to the extent that they frictionally contact the outer circumference of the male check member 22. This frictional contact, usually to the right of a lip or abutment 90 on the male coupler 20, is sufficient to hold the male coupler 20 in the engagement bore 14.

As the male coupler 20 is inserted into the engagement bore 14, the elongated stem 31 of the main valve means 30, which is being held to the right by the spring 63, comes in contact with the male check ball 23. The elongated stem 31 moves the check ball 23 to the right away from the valve seat 26 and against the resisting spring force in the spring 24 until the check ball 23 contacts the stop 25. When this happens, the main valve means 30 will start to move leftward compressing the spring 63. The leftward movement of the main valve means 30 causes the beveled surface 32 on the main valve means 30 to move away from the interior valve seat 33, see FIG. 1. The passageway 21 is now open and fluid will flow as soon as the operator opens the valve 18.

To assure that the male check ball 23 is held to the right against the stop 25, in a right-to-left fluid flow condition, the compression spring 63 must have a higher compressive force than the spring 24 located in the male coupler 20.

Fluid can now flow both through the passageway 21 to the male coupler 20 and through the passage 34 to the outlet port 16. The fluid that does go through the passage 34 will not seep out when the spring 53 is present for it holds the movable secondary valve means 48 in a closed position except when the lever arm 83 is raised. When the spring 53 is not employed, the fluid pressure on the flat surface 49 will cause the movable secondary valve means 48 to close. With the outlet port 16 closed and assuming no pressure buildup in the male coupler 20, the fluid will flow until the operator closes the valve 18.

It is beneficial to note that generally a pair of hoses or lines are coupled to a pair of female couplers for each implement. This is because one line is for the flow of fluid from the tractor to the implement and the second line is for the return flow back to the tractor. When this situation is present, the flow of fluid in the return line will be from the male coupler 20 to the female coupler 10. This means that this fluid will flow leftward through the passageway 21 and to both the outlet port 16 and to the inlet port 15. Again, the outlet port 16 will be closed by the spring 53 or by the fluid pressure on the flat triangular surface 49. All subsequent flow will then be outward through the inlet port 15 until the operator terminates the flow by closing the valve 18.

Uncoupling in a Non-pressurized Situation

To uncouple a non-pressurized connection, the operator shuts off the flow of fluid by closing the valve 18. The operator then raises the lever arm 83 and activates the cam 81 which causes the cam lobe 84 to push the receptacle 12 to the right. The engagement balls 73 then enter the race 72 and the male coupler 20 is free to be withdrawn. Just prior to the disengagement of the engagement balls 73 from the male coupler 20, the second cam lobe 85 contacts the elongated stem 52 and pushes it to the right. This action opens the outlet port 16 and any pressurized fluid within the main cavity 13 is released. As the male coupler 20 is removed from the engagement bore 14, the beveled surface 32 of the movable main valve means 30 will contact the interior valve seat 33. This action is due to the force in the compression spring 63 and serves to block passageway 21. At the same time that this is occurring, the opening 27 in the male coupler 20 is sealed off by the force in the compression spring 24. This spring 24 pushes the male check ball 23 against the valve surface 26 so that no fluid within the hose can escape.

The lever arm 83 is then lowered by the operator and the uncoupling process is completed.

Coupling in a Pressurized Situation

To couple the female coupler 10 to a pressurized male coupler 20, the process differs in that the higher fluid pressure will prevent the male check ball 23 from opening passage 27 when the male coupler 20 is fully inserted into the engagement bore 14. This means that in the female coupler 10, the movable main valve means 30 is in its leftmost position and the beveled surface 32 is away from the interior valve seat 33. This leftward position of the movable main valve means 30 indicates that the compression spring 63 is compressed and the piston 55 is in a leftward position. The piston 55 has been driven to the left by the contact of the movable main valve means 30 against the snap ring 59.

The piston 55 will never be pushed so far left that it will be flush with the right-hand surface 42 of end member 41 because the compression spring 63 acting on the collar member 60 will limit the leftward travel of the movable main valve means 30. Therefore, the left-hand surface 57 of the piston 55 will always be subjected to fluid contact.

In order to open the male check member 22, the pressure within the receptacle 12 has to be increased. This is accomplished when the operator opens the valve 18 and introduces fluid through the inlet port 15. All the incoming fluid will be directed through the passage 34 because the passageway 21 is blocked. Since the outlet port is closed by the force of the spring 53, the flow of fluid through the passage 34 will cause the internal pressure to build. As the fluid pressure increases, it impinges on the large flat left-hand surface 57 of the piston 55. When the force caused by the buildup of both the fluid pressure in the female coupler 10 and the spring force of the compression spring 63 exceeds the combined resistance forces of both the fluid impinging on the right side of the male check ball 23 and the male compression spring 24, the piston 55 and main valve means 30 will move to the right. This movement will cause the elongated stem 31 to push the male check ball 23 to the right away from the valve seat 26. An opening 27 is now present between the two couplers and the fluid can flow through the passageway 21.

The pressure required in the female coupler 10 to create the above action is considerably less than the internal pressure present in the male coupler 20. This required pressure is directly proportional to the differences of the areas between the left-hand surface 57 of the piston 55 and the surface area surrounded by circular seat 26.

Uncoupling in a Pressurized Situation

The uncoupling of a pressurized male coupler is the same as that described above for the non-pressurized uncoupling situation.

While the invention has been described in conjunction with a specific embodiment, it is to be understood that many alternatives, modifications, and variations will be apparent to those skilled in the art in light of the aforegoing description. Accordingly, it is intended to embrace all such alternatives, modifications, and variations which fall within the spirit and scope of the appended claims.

I claim:

1. A female coupler for coupling to and uncoupling from a male coupler which has a movable male check member positioned at the end of a hose, said female coupler comprising:
   (a) a housing;
   (b) a receptacle movably positioned within said housing comprising a main cavity with an interior valve seat, an inlet and an outlet port communicating with said main cavity, and an engagement bore connected to said main cavity by a passageway, said engagement bore capable of receiving said male coupler;
   (c) movable main valve means situated within said main cavity for controlling the flow of fluid between said main cavity and said engagement bore, said movable main valve means comprising a valve member with a passage communicating between said inlet and outlet ports, an elongated stem positioned at one end of said valve member capable of projecting into said engagement bore and contacting said male check member, and a beveled surface formed on said valve member adjacent to said elongated stem, said beveled surface capable of mating with said interior valve seat of said receptacle for blocking said passageway;
   (d) movable secondary valve means situated in said outlet port for controlling the flow of fluid through said outlet port between an open and a closed position; and
   (e) lever-actuatable cam means pivotally attached to said housing for moving both said receptacle and said secondary valve means.

2. The female coupler of claim 1 wherein said movable main valve means is a poppet valve.

3. The female coupler of claim 1 wherein said movable secondary valve means is a poppet valve.

4. The female coupler of claim 3 wherein said poppet valve extends outward beyond the opening of said outlet port.

5. The female coupler of claim 1 wherein said lever-actuatable cam means comprises two cam lobes, one cam lobe engageable with said receptacle and the second cam lobe engageable with said secondary valve means.

6. The female coupler of claim 1 wherein said movable main valve means is spring biased to a closed position wherein said beveled surface of said main valve means mates with said interior valve seat of said receptacle.

7. A female coupler for coupling to and uncoupling from a male coupler which has a movable male check member positioned at the end of a hose, said female coupler comprising:
   (a) a housing;
   (b) a movable receptacle contained in said housing comprising a main cavity with an interior valve seat, an inlet and an outlet port communicating with said main cavity, and an engagement bore connected to said main cavity by a passageway, said engagement bore capable of receiving said male coupler;
   (c) movable main valve means situated within said main cavity for controlling the flow of fluid between said main cavity and said engagement bore, said movable main valve means comprising a valve member with a passage communicating between said inlet and outlet ports, an elongated stem positioned at one end of said valve member capable of projecting into said engagement bore and contacting said male check member, and a beveled surface formed on said valve member adjacent to said elongated stem, said beveled surface capable of mating with said interior valve seat of said receptacle for blocking said passageway; and
   (d) piston means movably positioned within said main cavity between said main valve means and said outlet port for assisting in moving said main valve means against excessive pressures contained in said male coupler when said outlet port is closed, said piston means having a first surface on which said fluid can impinge and a second surface which contacts said main valve means.

8. A female coupler for coupling to and uncoupling from a male coupler which has a movable male check member positioned at the end of an internal passageway, said female coupler comprising:
   (a) a housing;
   (b) a receptacle movably positioned within said housing comprising a centrally located main cavity with an interior valve seat, a peripherally situated inlet port and an axially located outlet port both communicating with said main cavity, and an engagement bore axially aligned with and connected to said main cavity by a passageway, said engagement bore capable of receiving said male check member;
   (c) movable main valve means situated within said main cavity for controlling the flow of fluid between said main cavity and said engagement bore by moving from an open position to a closed position, said movable main valve means comprising a cylindrical member with a narrow internal passage formed therein, said narrow internal passage communicating between said inlet and outlet ports, an elongated circular stem positioned at one end of said cylindrical member capable of projecting into said engagement bore and contacting said male check member, and a beveled surface formed on said cylindrical member adjacent to said elongated stem, said beveled surface capable of mating with said interior valve seat of said receptacle for blocking said passageway;
   (d) movable secondary valve means situated in said outlet port for moving between an open and a closed position for controlling the flow of fluid through said outlet port;
   lever-actuatable cam means pivotally attached to said housing for moving both said receptacle and said secondary valve means; and
   (f) attachment means secured to said receptacle for holding said male coupler in said engagement bore.

9. A female coupler for coupling to and uncoupling from a male coupler which has a movable male check member positioned at the end of a hose, said female coupler comprising:
   (a) a housing;
   (b) a receptacle movably positioned within said housing comprising a main cavity with an interior valve seat, an inlet and an outlet port communicating with said main cavity, and an engagement bore connected to said main cavity by a passageway, said engagement bore capable of receiving said male coupler;
   (c) movable main valve means situated within said main cavity for controlling the flow of fluid between said main cavity and said engagement bore by moving between an open position and a closed position, said movable main valve means comprising a valve member with an internal passage formed therein, said internal passage communicating between said inlet and outlet ports, an elongated stem positioned at one end of said valve member capable of projecting into said engagement bore and contacting said male check member, and a beveled surface formed on said valve member adjacent to said elongated stem, said beveled surface capable of mating with said interior valve seat of said receptacle for blocking said passageway;

(d) movable secondary valve means situated in said outlet port for controlling the flow of fluid through said outlet port by moving between an open and a closed position;

(e) piston means movably positioned within said main cavity between said main valve means and said secondary valve means for assisting in moving said main valve means against excessive pressures contained in said male coupler, said piston means having a first surface on which said fluid can impinge and a second surface which contacts said main valve means; and (f) lever-actuatable cam means pivotally attached to said housing for moving both said receptacle and said secondary valve means.

10. The female coupler of claim 9 wherein said movable main valve means is a poppet valve.

11. The female coupler of claim 9 wherein said movable secondary valve means is a poppet valve.

12. The female coupler of claim 11 wherein said poppet valve extends outward beyond the opening of said outlet port.

13. The female coupler of claim 9 wherein said lever-actuatable cam means comprises two cam lobes, one cam lobe engageable with said receptacle and the second cam lobe engageable with said secondary valve means.

14. The female coupler of claim 9 wherein said movable main valve means is spring biased to a closed position wherein said beveled surface of said main valve means mates with said interior valve seat of said receptacle.

15. The female coupler of claim 9 wherein said movable secondary valve means is spring biased to a closed position blocking said outlet port.

16. A female coupler for coupling to and uncoupling from a male coupler which has a movable male check member positioned at the end of an internal passageway, said female coupler comprising:

(a) a housing;

(b) a receptacle movably positioned within said housing comprising a centrally located main cavity with an interior valve seat, a peripherally situated inlet port and an axially located outlet port both communicating with said main cavity, and an engagement bore axially aligned with and connected to said main cavity by a passageway, said engagement bore capable of receiving said male check member;

(c) movable main valve means situated within said main cavity for controlling the flow of fluid between said main cavity and said engagement bore by moving from an open position to a closed position, said movable main valve means comprising a cylindrical member with a narrow internal passage formed therein, said narrow internal passage communicating between said inlet and outlet ports, an elongated circular stem positioned at one end of said cylindrical member capable of projecting into said engagement bore and contacting said male check member, and a beveled surface formed on said cylindrical member adjacent to said elongated stem, said beveled surface capable of mating with said interior valve seat of said receptacle for blocking said passageway;

(d) movable secondary valve means situated in said outlet port for moving between an open and a closed position for controlling the flow of fluid through said outlet port;

(e) piston means movably positioned within said main cavity between said main valve means and said secondary valve means for assisting in moving said main valve means against excessive pressures contained in said male coupler, said piston means having a first planar surface on which said fluid can impinge and a second surface which contacts said main valve means;

(f) lever-actuatable cam means pivotally attached to said housing for moving both said receptacle and said secondary valve means; and (g) attachment means secured to said receptacle for holding said male coupler in said engagement bore.

17. The female coupler of claim 16 wherein said movable main valve means is spring biased to a closed position blocking said passageway.

18. The female coupler of claim 16 wherein said movable secondary valve means is spring biased to a closed position blocking said outlet port.

* * * * *

UNITED STATES PATENT AND TRADEMARK OFFICE
CERTIFICATE OF CORRECTION

PATENT NO. : 4,303,098
DATED : 1 December 1981
INVENTOR(S) : Aloysius C. Shindelar It is certified that error appears in the above-identified patent and that said Letters Patent is hereby corrected as shown below:

Column 10, line 48, before "lever-actuatable", insert -- (e) --.

Signed and Sealed this

Fifth Day of July 1983

[SEAL]

Attest:

GERALD J MOSSINGHOFF

Attesting Officer

Commissioner of Patents and Trademarks